(12) United States Patent
Zhang et al.

(10) Patent No.: US 12,380,684 B2
(45) Date of Patent: Aug. 5, 2025

(54) DEEP ASSOCIATION FOR SENSOR FUSION

(71) Applicant: Aptiv Technologies AG, Schaffhausen (CH)

(72) Inventors: Shan Zhang, Yorba Linda, CA (US); Nianxia Cao, Oak Park, CA (US); Kanishka Tyagi, Agoura Hills, CA (US); Xiaohui Wang, Oak Park, CA (US); Narbik Manukian, Los Angeles, CA (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 333 days.

(21) Appl. No.: 17/929,612

(22) Filed: Sep. 2, 2022

(65) Prior Publication Data

US 2023/0410490 A1    Dec. 21, 2023

Related U.S. Application Data

(60) Provisional application No. 63/364,524, filed on May 11, 2022.

(51) Int. Cl.
*G06V 10/80* (2022.01)
*G01S 13/86* (2006.01)
(Continued)

(52) U.S. Cl.
CPC .......... *G06V 10/806* (2022.01); *G01S 13/865* (2013.01); *G01S 13/867* (2013.01);
(Continued)

(58) Field of Classification Search
CPC ...... G06V 10/806; G06V 20/56; G06V 20/58; G01S 13/865; G01S 13/867; G01S 13/931; G01S 17/86; G01S 17/931
See application file for complete search history.

(56) References Cited

U.S. PATENT DOCUMENTS 8,705,797 B2 * 4/2014 Zeng ............... G01S 13/931
348/169
10,565,468 B2 * 2/2020 Schiffmann ............. G01S 13/42
(Continued)

FOREIGN PATENT DOCUMENTS

WO    WO-2021113346 A1 *  6/2021  ........... G05D 1/0088

OTHER PUBLICATIONS

"Extended European Search Report," EP Application No. 23167003.5, Sep. 13, 2023, 8 pages.
(Continued)

*Primary Examiner* — Shelby A Turner
*Assistant Examiner* — Yaritza H Perez Bermudez
(74) *Attorney, Agent, or Firm* — Harness, Dickey & Pierce, P.L.C.

(57) ABSTRACT

This document describes systems and techniques related to deep association for sensor fusion. For example, a model trained using deep machine learning techniques, may be used to generate an association score matrix that includes probabilities that tracks from different types of sensors are related to the same objects. This model may be trained using a convolutional recurrent neural network and include constraints not included in other training techniques. Focal loss can be used during training to compensate for imbalanced data samples and address difficult cases, and data expansion techniques can be used to increase the multi-sensor data space. Simple thresholding techniques can be applied to the association score matrix to generate an assignment matrix that indicates whether tracks from one sensor and tracks from another sensor match. In this manner, the track association process may be more accurate than current sensor fusion techniques, and vehicle safety may be increased.

15 Claims, 5 Drawing Sheets

(51) Int. Cl.
  *G01S 13/931* (2020.01)
  *G01S 17/86* (2020.01)
  *G01S 17/931* (2020.01)
  *G06V 20/56* (2022.01)

(52) U.S. Cl.
  CPC ............ *G01S 13/931* (2013.01); *G01S 17/86* (2020.01); *G01S 17/931* (2020.01); *G06V 20/56* (2022.01)

(56) References Cited

U.S. PATENT DOCUMENTS

| | | | | |
|---|---|---|---|---|
| 10,782,396 | B2* | 9/2020 | Turner | G01S 13/726 |
| 11,024,043 | B1* | 6/2021 | Othman | G06T 7/292 |
| 2010/0217439 | A1* | 8/2010 | Park | G05D 1/0238 |
| | | | | 901/1 |
| 2015/0324652 | A1* | 11/2015 | Mizutani | G01S 13/867 |
| | | | | 382/103 |
| 2016/0171893 | A1* | 6/2016 | Chen | G08G 1/0112 |
| | | | | 701/300 |
| 2017/0206436 | A1* | 7/2017 | Schiffmann | G01S 13/931 |
| 2018/0267544 | A1* | 9/2018 | Lee | G01S 13/931 |
| 2018/0300561 | A1* | 10/2018 | Steyer | G01S 13/726 |
| 2019/0258251 | A1* | 8/2019 | Ditty | G05D 1/0274 |
| 2019/0325223 | A1* | 10/2019 | Chen | G06V 20/58 |
| 2020/0042799 | A1* | 2/2020 | Huang | G06V 10/764 |
| 2020/0064483 | A1* | 2/2020 | Li | G01S 13/867 |
| 2020/0324795 | A1* | 10/2020 | Bojarski | G06V 10/764 |
| 2021/0131823 | A1* | 5/2021 | Giorgio | G01S 17/931 |
| 2021/0231794 | A1* | 7/2021 | Song | G06F 18/251 |
| 2021/0276598 | A1* | 9/2021 | Amirloo Abolfathi | B60W 30/09 |
| 2022/0153306 | A1* | 5/2022 | Imran | G06T 7/292 |
| 2022/0300743 | A1* | 9/2022 | Imran | G01S 13/931 |
| 2023/0046396 | A1* | 2/2023 | Sevagamoorthy | G01S 13/867 |
| 2023/0048926 | A1* | 2/2023 | Kurbiel | G01C 21/3691 |
| 2023/0147100 | A1* | 5/2023 | Imran | G06V 20/56 |
| | | | | 701/117 |
| 2023/0298360 | A1* | 9/2023 | Yoo | G06V 20/588 |
| | | | | 382/103 |
| 2023/0314599 | A1* | 10/2023 | Jia | G01S 13/86 |
| | | | | 701/28 |

OTHER PUBLICATIONS

Mafeni Mase Jimiama et al., "A Hybrid Deep Learning Approach for Driver Distraction Detection", 2020 Int'l Conf. on Information and Communication Technology Convergence (ICTC), Oct. 21, 2020, pp. 1-6, XP093078819, DOI: 10.1109/ICTC49870.2020. 9289588, ISBN: 978-1-7281-6758-9.

Dong, et al., "Radar Camera Fusion via Representation Learning in Autonomous Driving", Jun. 18, 2021, 10 pages.

Ma, et al., "Deep Association: End-to-end Graph-Based Learning for Multiple Object Tracking with Conv-Graph Neural Network", 2019, 9 pages.

Milan, et al., "Data-Driven Approximations to NP-Hard Problems", 2017, 7 pages.

Sun, et al., "Deep Affinity Network for Multiple Object Tracking", Jul. 16, 2019, 15 pages.

Yao, et al., "Deep Neural Networks for Data Association in Particle Tracking", 2018, 4 pages.

Yoon, et al., "Data Association for Multi-Object Tracking via Deep Neural Networks", Jan. 29, 2019, 15 pages.

* cited by examiner

DEEP ASSOCIATION FOR SENSOR FUSION

CROSS-REFERENCE TO RELATED APPLICATION

This application claims the benefit of U.S. Provisional Patent Application No. 63/364,524, filed May 11, 2022, which is incorporated by reference herein in its entirety.

BACKGROUND

Automotive vehicles are becoming more sophisticated with the addition of sensors used to track objects near the vehicle. These objects may include other vehicles, pedestrians, animals, and inanimate objects, such as trees and street signs. The sensors (e.g., optical cameras, radar systems, Light Detection and Ranging (LiDAR) systems) may be crucial parts of the perception systems of these vehicles. Fusing sensor data from different sensors can provide opportunities to exploit the complementary properties of each type of sensor. For example, radars are advantageous when estimating distance and velocity information while camera images can provide more accurate pixel information related to an object. A key challenge of sensor fusion is accurate data association during the fusion of the tracks derived from each type of sensor.

SUMMARY

This document describes systems and techniques related to deep association for sensor fusion. For example, a model trained using deep machine learning techniques, may be used to generate an association score matrix that includes probabilities that tracks (e.g., object tracks) from different types of sensors are related to the same objects. This model may be trained using a convolutional recurrent neural network and include constraints not included in other training techniques. Focal loss can be used during training to compensate for imbalanced data samples and address difficult cases, and data expansion techniques can be used to increase the multi-sensor data space. Simple thresholding techniques can be applied to the association score matrix to generate an assignment matrix that indicates whether tracks from one sensor and tracks from another sensor match. In this manner, the track association process may be more accurate than current sensor fusion techniques, and vehicle safety may be increased.

Aspects described below include deep association for sensor fusion. In one example, a method includes determining, using first sensor data obtained by a first sensor of a vehicle, a first plurality of tracks, each track of the first plurality of tracks related to a different first object of a first plurality of objects. The method further includes determining, using second sensor data obtained by a second sensor of the vehicle, a second plurality of tracks, each track of the second plurality of tracks related to a different second object of a second plurality of objects. The method further includes generating, based on the first plurality of tracks and the second plurality of tracks, an association score matrix indicative of a probability that each first object in the first plurality of objects and each second object in the second plurality of objects are a same object. The method further includes applying a threshold to each element of the association score matrix. The method further includes generating, based on applying the threshold to the association score matrix, an assignment matrix that is indicative that each first object from the first plurality of objects is associated with a second object from the second plurality of objects. The method further includes outputting, based on the assignment matrix and to an automotive system of the vehicle, information identifying that first objects from the first plurality of objects and second objects from the second plurality of objects, respectively are same objects.

In another example, a system includes at least one processor that can be configured to determine, using first sensor data obtained by a first sensor of a vehicle, a first plurality of tracks, each track of the first plurality of tracks related to a different first object of a first plurality of objects. The at least one processor can be further configured to determine, using second sensor data obtained by a second sensor of the vehicle, a second plurality of tracks, each track of the second plurality of tracks related to a different second object of a second plurality of objects. The at least one processor can be further configured to generate, based on the first plurality of tracks and the second plurality of tracks, an association score matrix indicative of a probability that each first object in the first plurality of objects and each second object in the second plurality of objects are a same object. The at least one processor can be further configured to apply a threshold to each element of the association score matrix. The at least one processor can be further configured to generate, based on applying the threshold to the association score matrix, an assignment matrix that is indicative that each first object from the first plurality of objects is associated with a second object from the second plurality of objects. The at least one processor can be further configured to output, based on the assignment matrix and to an automotive system of the vehicle, information identifying that first objects from the first plurality of objects and second objects from the second plurality of objects, respectively, are same objects.

These and other described techniques may be performed by hardware or a combination of hardware and software executing thereon. For example, a computer-readable storage media (CRM) may have instructions stored thereon and that when executed configure a processor to perform the described techniques. A system may include means for performing the described techniques. A processor or processor unit may be part of a system that is configured to execute the methods and techniques described herein.

This Summary introduces simplified concepts related to deep association for sensor fusion, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of machine-learning-based super resolution of radar data is described in this document with reference to the Drawings that may use same numbers to reference like features and components, and hyphenated numbers to designate variations of these like features and components. The Drawings are organized as follows.

DETAILED DESCRIPTION

Overview

Figure 1:
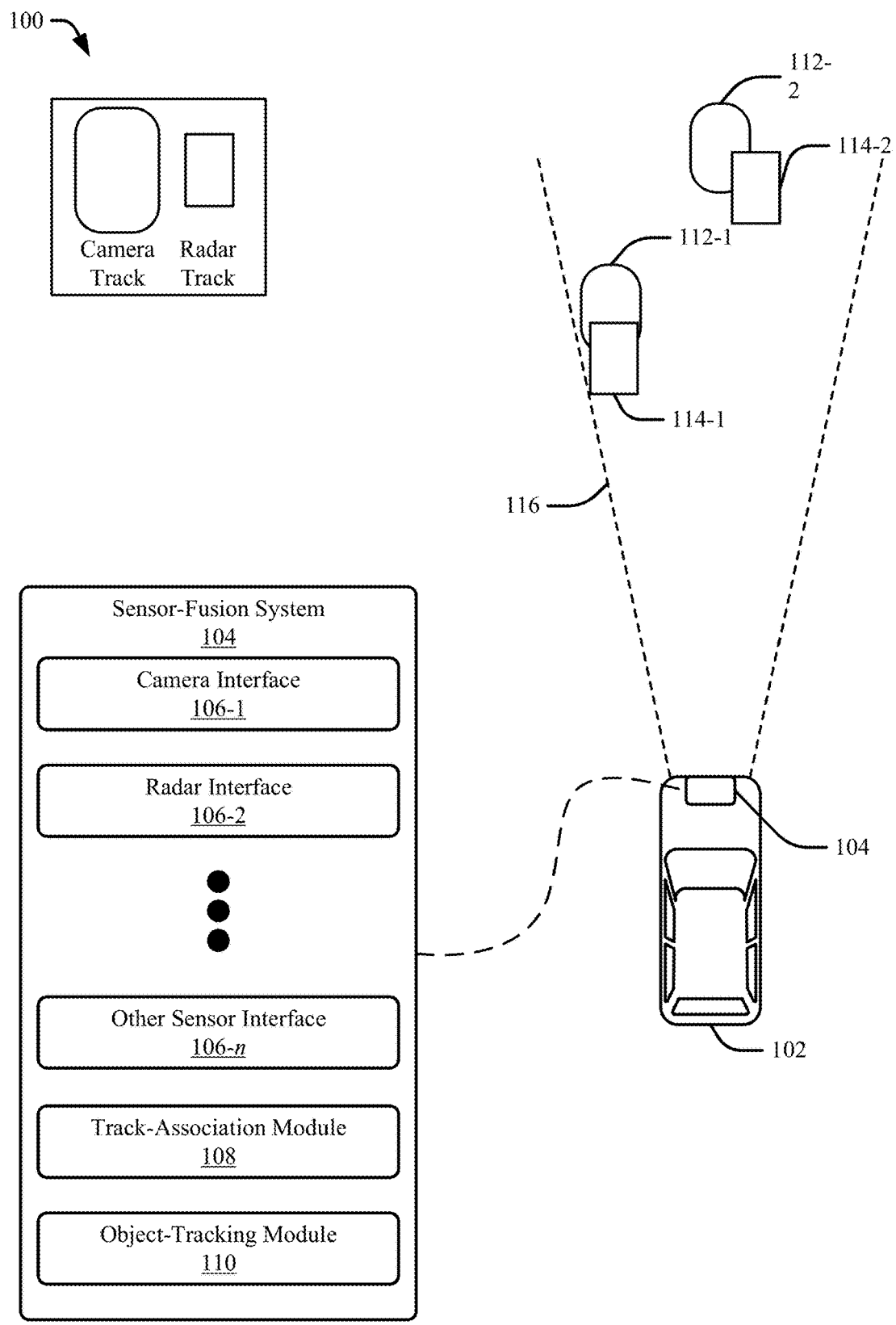
FIG. 1 illustrates an example operating environment of a vehicle that is configured for deep association for sensor fusion, in accordance with techniques of this disclosure.

A key challenge of sensor fusion is associating the data from one sensor with the data from another sensor. This challenge is amplified when the sensors provide data that is not easily relatable. For example, a radar sensor can obtain information about objects in an environment that includes range, range rate, azimuth angles, and elevation angles. The information obtained by a camera can be derived from the pixels in the camera image. Associating the data (e.g., data contained in the sensor tracks) of these different sensors can be difficult because the data from each sensor is in different forms.

The problem of measurement to measurement/track association has been explored. Some methods involve using a recurrent neural network to produce an association score matrix (e.g., a probability score matrix) related to a single sensor. Other methods have suggested using a graph neural network to learn interaction and relationships between graph nodes, where the graph nodes denote the data features. Other approaches propose using a deep affinity network with convolutional layers for data association. Some of these methods use unconstrained deep data association methodologies to obtain the association score matrix. Optimization, subject to association constraints, has been addressed using various algorithms such as binary integer programming or the Hungarian algorithm. Some of these methods used a mean squared error loss function for network training. However, improved accuracy of data association related to multiple sensors may be required in certain applications, particularly automotive applications In contrast to the above approaches, the techniques described in this document address data association across multiple sensors. The sensor fusion techniques described in this document can use a feature extractor and a memory-based neural network. In some aspects, the feature extractor and memory-based neural network can be arranged as an encoder/decoder architecture for a deep machine-learned model. The encoder includes a convolutional recurrent neural network, and the decoder incorporates the memory-based neural network. A constrained deep association loss function is used by the machine-learned model such that, with simple thresholding, a binary-based sparse matrix can be produced and is indicative of each respective track from one sensor being matched to a single respective track of another sensor. This loss function may be based on a focal loss function and may compensate for imbalanced data samples and address difficult cases during training of the model. Additionally, data expansion techniques (e.g., polynomial data expansion) can be used to increase multi-sensor data space. Using the techniques described herein may provide a more accurate fusion of sensor data (e.g., fused camera and radar data) required in driving situations. Also, minority data classes, which is typically difficult for data association, can be addressed during the training process.

Example Environment

FIG. 1 illustrates an example operating environment 100 of a vehicle 102 that is configured for deep association for sensor fusion, in accordance with techniques of this disclosure. In the depicted environment 100, a sensor-fusion system 104 is mounted to, or integrated within, the vehicle 102 Although illustrated as a passenger car, the vehicle 102 can represent other types of motorized vehicles (e.g., truck, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The sensor-fusion system 104 may include one or more sensor interfaces 106-1 through 106-n (collectively "sensor interfaces 106"), a track-association module 108, and an object-tracking module 110. The sensor interfaces 106-1 through 106-n may include a camera interface 106-1, a radar interface 106-2, and one or more other sensor interfaces 106-n. Each of the sensor interfaces 106 provides the sensor-fusion system 104 with sensor data of a particular type. For example, the camera interface 106-1 provides vision data (e.g., camera tracks 112) that may be generated by camera detectors using data (e.g., low-level data, unprocessed or minimally processed data) from one or more camera sensors. Similarly, the radar interface 106-2 provides radar data (e.g., radar tracks 114) produced by radar detectors using data (e.g., low-level data, unprocessed or minimally processed data) from one or more radar sensors. The camera tracks 112-1 and 112-2 and the radar tracks 114-2 are derived from the vision data and the radar data, respectively, and correspond to objects within a respective field-of-view (FOV) 116 of the sensors equipped on the vehicle 102.

The sensor-fusion system 104 can track objects in the FOV 116 based on the sensor data obtained from multiple sensors of the vehicle 102. Matching objects between multiple different sensors enables the sensor-fusion system 104 to reliably and accurately track objects that may need to be avoided while the vehicle 102 navigates the environment 100. For example, matching the camera track 112-1 and the radar track 114-1 to the same object enables the sensor-fusion system 104 to accurately track that object using the data from two different types of sensors. By leveraging the data from the two different types of sensors, any shortcomings of a particular type of sensor (e.g., cameras are less effective in foggy conditions) may be overcome, providing greater accuracy than data derived from a single type of sensor.

In general, manufacturers can mount the sensors and the sensor-fusion system 104 to any moving platform that can travel in the environment 100. The sensors can project their respective FOVs from any exterior surface of the vehicle 102. For example, vehicle manufacturers can integrate at least a part of the sensor-fusion system 104 (e.g., the sensors) into a side mirror, bumper, roof, or any other interior or exterior location where the FOV 116 includes a portion of the environment 100 and objects moving or stationary that are in the environment 100. Manufacturers can design the location of the sensors to provide a particular FOV that sufficiently encompasses portions of the environment 100 in which the vehicle 102 may be traveling. In the depicted implementation, a portion of the sensor-fusion system 104 is mounted near the front bumper section of the vehicle 102.

The track-association module 108 receives track data (e.g., the camera tracks 112, the radar tracks 114) from the sensor interfaces 106 and determines which camera tracks 112 associate with which radar tracks 114. The track-association module 108 generates an association score matrix to assist in this determination. The track-association module 108 may include a trained model that generates the association score matrix. The association score matrix indicates the likelihood that a particular camera track 112 and a particular radar track 114 should be associated. Each element of the association score matrix includes a probability related to a track pair (e.g., camera track 112-1 and radar track 114-1, camera track 112-1 and radar track 114-2, camera track 112-2 and radar track 114-2, camera track 112-2 and radar track 114-1). In this example, the camera track 112-1 and the radar track 114-1 are determined to be associated, and the camera track 112-2 and the radar track 114-2 are determined to be associated. The track-association module 108 can apply thresholding to the association score matrix and produce an assignment matrix. The assignment matrix includes binary values that indicate whether a track pair associate with a same object. The track-association module can output the assignment matrix (or object-track data derived from the assignment matrix) to the object-tracking module 110 and other automotive systems (not shown) to assist in driving functions of the vehicle 102 and safely navigate the environment 100. For example, the track-pair information in the assignment matrix may have the accuracy required to enable the vehicle 102 to avoid collisions with objects represented by the objects associated with the camera and radar fusion of [camera track 112-1, radar track 114-1] and [camera track 112-2, radar track 114-2].

Example Systems

Figure 2:
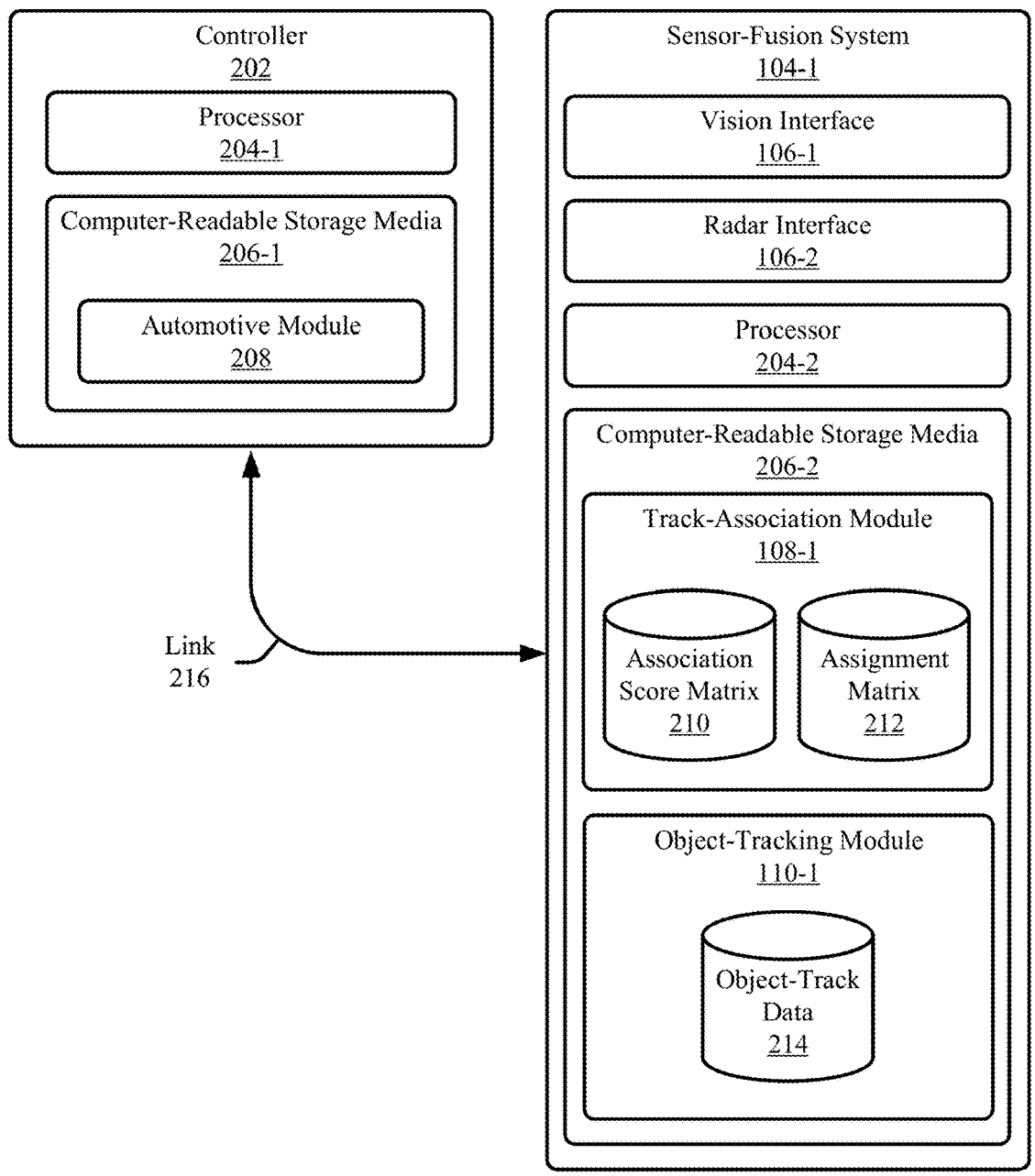
FIG. 2 illustrates an example of an automotive system configured for deep association for sensor fusion, in accordance with techniques of this disclosure.

FIG. 2 illustrates an example of an automotive system 200 configured for deep association for sensor fusion, in accordance with techniques of this disclosure. The automotive system 200 can be integrated within the vehicle 102. For example, the automotive system 200 includes a controller 202 and a sensor-fusion system 104-1. The sensor-fusion system 104-1 is an example of the sensor-fusion system 104 and can be integrated into an automotive or other vehicular environment. The sensor-fusion system 104-1 and the controller 202 communicate over a link 216. The link 216 may be a wired or wireless link and in some cases includes a communication bus. The controller 202 performs operations based on information received over the link 216, such as data output from the sensor-fusion system 104 as objects in the FOV 116 are identified from processing and merging object tracks.

The controller 202 includes a processor 204-1 (e.g., application processors, microprocessors, digital signal processors (DSP), or system-on-chip (SoC)) that is configured to execute computer-executed instructions stored within a computer-readable storage media (CRM) 206-1 (e.g., non-transitory storage devices such as hard drives, solid state drives (SSD), flash memories, read-only memories (ROM), erasable programmable ROM (EPROM), or electrically erasable programmable ROM (EEPROM)). As an example, the processor 204-1 can execute the automotive module 208 to perform a driving function or other operation of the automotive system 200.

The sensor-fusion system 104-1 includes a camera interface 106-1, and a radar interface 106-2. Any number of other sensor interfaces including the sensor interfaces 106 may likewise be used. The sensor-fusion system 104-1 may include processing hardware that includes a processor 204-2 and a computer-readable storage medium (CRM) 206-2, which stores instructions associated with a track-association module 108-1 and an object-tracking module 110-1. The track-association module 108-1, which is an example of the track-association module 108, can generate an association score matrix 210 and an assignment matrix 212. The object-tracking module 110-1, which is an example of the object-tracking module 110, includes object-track data 214. The object-track data 214 includes data of each track pair determined by the track-association module 108-1 and recorded in the assignment matrix 212.

The processor 204-2 can execute the track-association module 108-1 to infer objects in the FOV 116 based on sensor data obtained from multiple different sensor interfaces 106 of the vehicle 102. The automotive module 208, when executing at the processor 204-1, can receive an indication of one or more objects tracked by the object-tracking module 110-1 in response to the object-tracking module 110-1 receiving object-track pair data from the track-association module 108-1. The track-association module 108-1 determines the object-track pair data by combining and analyzing sensor data generated at each of the sensor interfaces 106 (e.g., the camera interface 106-1 and the radar interface 106-2) as previously described.

Generally, the automotive system 200 executes the automotive module 208 to perform a function. For example, the automotive module 208 can provide automatic cruise control and monitor for the presence of objects in the environment 100. In such an example, the object-tracking module 110-1 provides the object-track data 214 to the automotive module 208. The automotive module 208 may provide alerts when the data obtained from the object-tracking module 110-1 indicates one or more objects are crossing in front of the vehicle 102.

For ease of simplicity, implementations of the cluster-splitting submodule 210-1 of the track-matching module 108-1 are described below with reference primarily to the camera interface 106-1 and the radar interface 106-2, without reference to the other sensor interfaces 106. It should be understood, however, that the track-association module 108-1 can combine sensor data from more than just two different categories of sensors and can rely on sensor data output from other types of sensors (e.g., light detection and ranging (LiDAR) sensors) besides just cameras and radar.

Example Implementations

Figure 3:
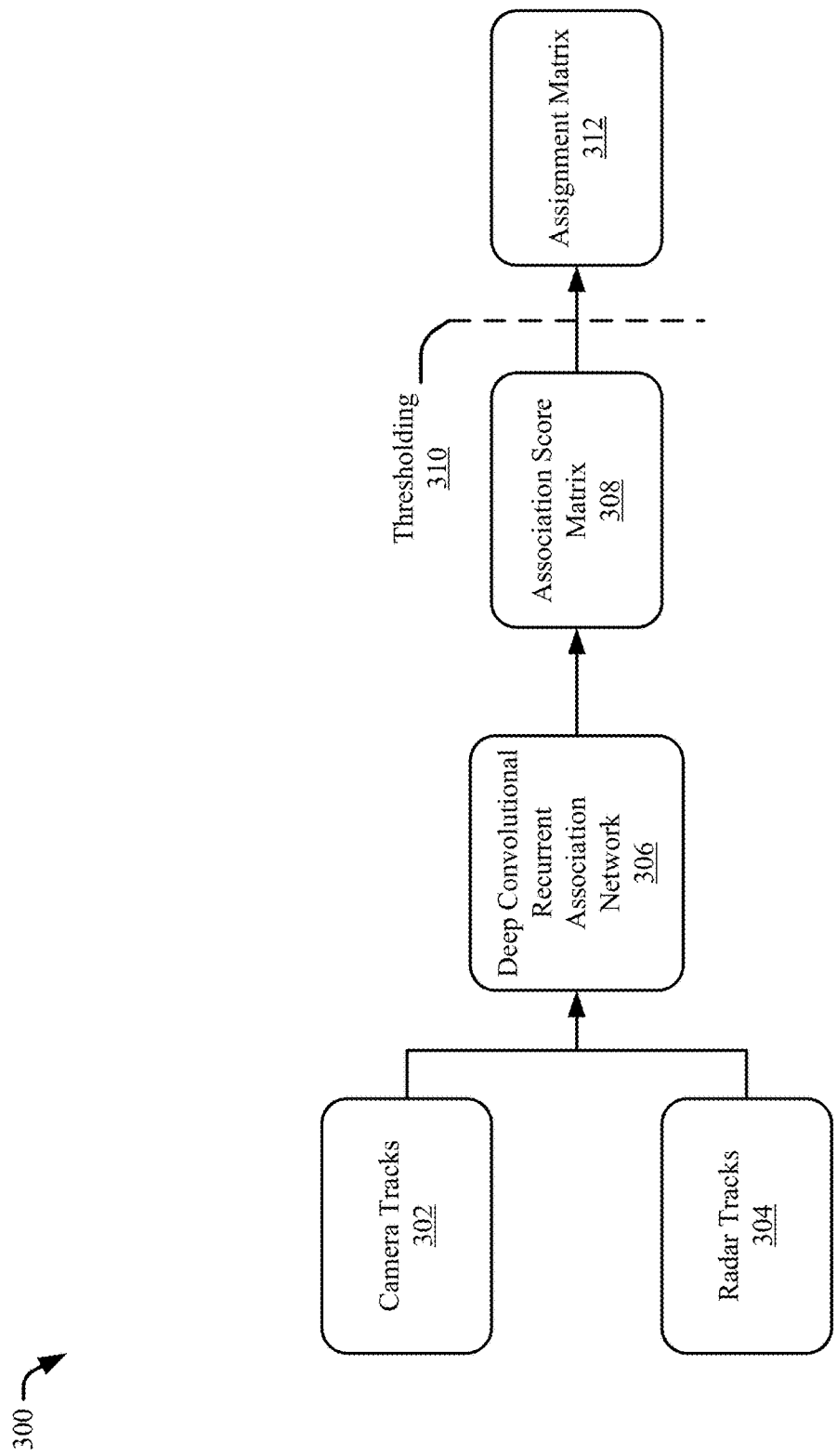
FIG. 3 illustrates an example track-association pipeline for deep association for sensor fusion, in accordance with techniques of this disclosure.

FIG. 3 illustrates an example track-association pipeline 300 for deep association for sensor fusion, in accordance with techniques of this disclosure. The track-association pipeline 300 may be executed in a track-association module (e.g., the track-association module 108, 108-1) or in some other processing structure. Camera tracks 302 are obtained from data received by a camera detector, and radar tracks 304 are obtained from data received by a radar detector. Attributes contained by the camera tracks 302 and the radar tracks 304 may include x-coordinate position, y-coordinate position, pointing angle, x-coordinate velocity, y-coordinate velocity, object width, object length, and object class. Additionally, the radar tracks 304 may include a movable flag that indicates whether an object is stationary (e.g., movable flag equals zero) or is moving (e.g., movable flag equals one).

Figure 4:
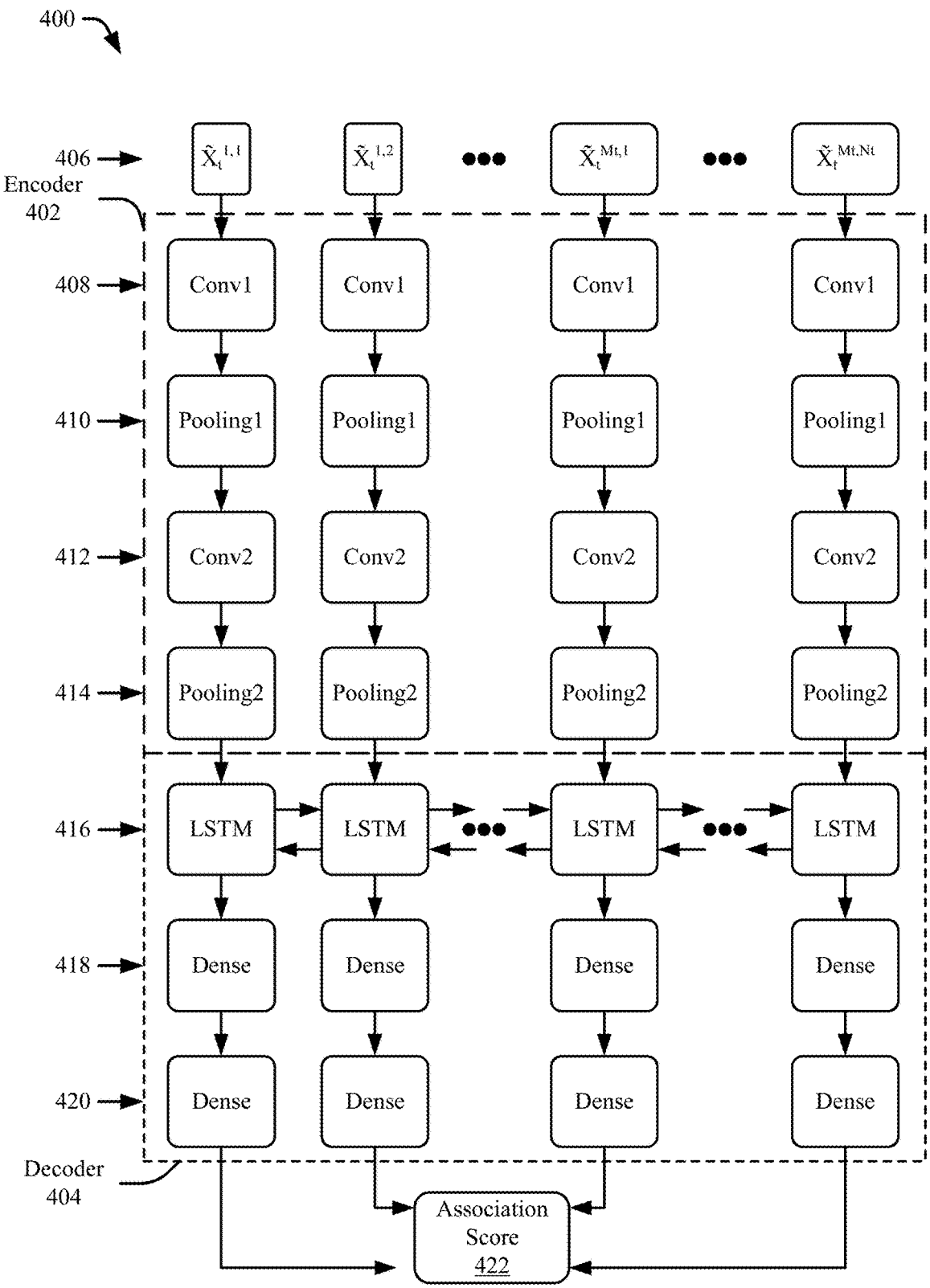
FIG. 4 illustrates an example deep convolutional recurrent association network for deep association for sensor fusion, in accordance with techniques of this disclosure.

The camera tracks 302 and the radar tracks 304 are input into a deep convolutional recurrent association network 306 (see FIG. 4 for an example network). The deep convolutional recurrent association network 306 can have an encoder/decoder architecture. The encoder utilizes convolutional neural networks to extract abstract features for each input data, and the decoder uses memory-based networks (e.g., long short-term memory recurrent neural networks (LSTM)) to learn the relationships among the extracted features. In some aspects, memory-based networks (e.g., transformer networks) that have the ability to analyze both past and future frames can be used. These networks may lead to even better track association by looking in both directions in time.

The deep convolutional recurrent association network 306 outputs an association score matrix 308. The association score matrix 308 is a probability score matrix. That is, each element of the association score matrix 308 contains a probability of the likelihood that the respective camera track 302 and radar track 304 of the track pair represented by the element match to a same object. The association score matrix 308 can be denoted by $Z \in \mathcal{R}^{M \times N}$, where M is the number of camera tracks, N is the number of radar tracks, and $0 \leq Z_{i,j} \leq 1$, i=1, 2, ..., M, j=1, 2, ..., N.

Thresholding 310 is applied to the association score matrix 308 to produce an assignment matrix 312. The assignment matrix 312 is a binary matrix. Each element of the assignment matrix 312 is a binary value that indicates whether each track in the respective track pair corresponds to the same object. The assignment matrix 312 can be denoted by $A \in \mathcal{R}^{M \times N}$, where $A_{i,j}=1$ if i and j correspond to the same object, and $A_{i,j}=0$ if i and j do not correspond to the same object.

To improve the accuracy of the assignment matrix 312, the deep convolutional recurrent association network 306 model is trained with two association constraints: one radar track 304 can be associated with at most one camera track 302, and one camera track 302 can be associated with at most one radar track 304. Additionally, the multi-sensor data space is increased by using data expansion techniques (e.g., polynomial data expansion). Because radar/camera track association can be highly imbalanced and include hard examples as well as easy examples, focal loss with regularizations can be used to balance the radar/camera track association. In this manner, the track associations may improve object tracking resulting in a safer driving experience.

FIG. 4 illustrates an example deep convolutional recurrent association network (DCRAN) 400 for deep association for sensor fusion, in accordance with techniques of this disclosure. The DCRAN 400 includes an encoder 402 and a decoder 404. The inputs 406 are fed into the encoder 402. In this example, the encoder 402 includes a convolutional layer 408 that feeds a pooling layer 410. The pooling layer 410 feeds a second convolutional layer 412, and the convolutional layer 412 feeds a second pooling layer 414.

The decoder includes an LSTM layer 416 (e.g., memory-based layer) followed by a first dense layer 418 and a second dense layer 420. Alternatively, the LSTM layer 416 can be replaced by a transformer layer. The output is an association score matrix 422. In other aspects, the encoder 402 and decoder 404 may include more or less layers and/or one or more different layers than the layers described above.

For example, for the inputs 406, at time t, the number of camera tracks is $M_t$ and the number of radar tracks is $N_t$. $c_t^i$ is the i-th camera track at time t and $r_t^j$ is the j-th radar track at time t, where i=1, 2, ..., $M_t$ and j=1, 2, ..., $N_t$. $c_t^i$ is a vector that contains camera track data: x-coordinate position, y-coordinate position, pointing angle, x-coordinate velocity, y-coordinate velocity, object width, object length, and object class. $r_t^j$ is a vector that contains radar track data that includes the corresponding x-coordinate position, y-coordinate position, pointing angle, x-coordinate velocity, y-coordinate velocity, object width, object length, object class, and a movable flag. $X_t^{i,j}=[c_{t-K+1:t}^i \ r_{t-K+1:t}^j] \in \mathcal{R}^{K \times L}$ is a stacked data matrix of i-th camera track with K history information, denoted by $c_{t-K+1:t}^i$, and j-th radar track with K history information, denoted by $r_{t-K+1:t}^j$, where L denotes the number of data points from the stack camera and radar track.

A polynomial data expansion technique is used to increase the current track attribute space, thus, improving the model using the non-linear relationship between the input data and the assignment matrix. The expanded data can be denoted by $\tilde{X}_t^{i,j} \in \mathcal{R}^{K \times \tilde{L}}$ for i-th camera tracks and j-th radar tracks. The input of the encoder 402 is $\tilde{X}_t^{i,j}$, where i=1, 2, ..., $M_t$, j=1, 2, ..., $N_t$, and $\tilde{L}$ are the expanded data dimension. The output of the decoder network is the association score matrix 422 denoted by $Z_t \in \mathcal{R}^{M_t \times N_t}$ for each camera-radar data pair.

During training of the DCRAN 400, ground truth association matrices, denoted by $Y_t \in \mathcal{R}^{M_t \times N_t}$, t=1, 2, ..., T can be used as labels. Further, two association constraints can be incorporated into the training. The first constraint is that one radar track can be associated to, at most, one camera track. The second constraint is that one camera track can be associated to, at most, one radar track. To address the classification problem of the camera-radar association being highly imbalanced and including difficult examples, along with the association constraints, focal loss with regularization terms can be used as defined by:

$$\frac{1}{N_s} \sum_{t=1}^{N_s} \sum_{i,j} \left( -\sum_c \alpha_w^c (1 - p_w^c)^\gamma \log p_w^c \right) + \text{regularizations}$$

where the first term denotes focal loss, and the second term denotes regularized loss. For the focal loss, $N_s$, is the number of data samples and t denotes a sample index. c is a class index, where c=1 denotes that two tracks match ($Y_t^{i,j}=1$). Otherwise, c=0 denotes that two tracks do not match ($Y_t^{i,j}=0$). $\alpha_w^c$ and $\gamma$ can be used to address the imbalanced data and hard examples, respectively, where $\alpha_w^1 = \alpha$, if $Y_t^{i,j}=1$, $\alpha_w^0=1-\alpha$, if $Y_t^{i,j}=0$ and optimal $\alpha$, $\gamma$ can obtained using a grid search. $p_w^1 = Z_t^{i,j}$, if $Y_t^{i,j}=1$, $p_w^0 = 1 - Z_t^{i,j}$, if $Y_t^{i,j}=0$, where i=1, 2, ..., $M_t$ and j=1, 2, ..., $N_t$. The regularization term consist of two parts: $\mathcal{L}_1$ penalty and mean-squared error-based association restraints, given as $$\frac{1}{N_s} \sum_{t=1}^{N_s} \left( \sum \|Z_t - Y_t\|_1 \right) + \frac{1}{N_s} \sum_{t=1}^{N_s} \left( \sum \left( \sum_i Z_t^{i,j} - 1 \right)^2 + \sum \left( \sum_j Z_t^{i,j} - 1 \right)^2 \right).$$

Additionally, pruning techniques can further improve the model.

After generating the association score matrix 422 including the association probability scores $Z_t$, an assignment matrix $A_t$ (e.g., the assignment matrix 312) can be obtained using Eq. 1:

$$A_t^{i,j}=1 \text{ if } A_t^{i,j} > s_{threshold}, \text{ otherwise } 0 \qquad \text{Eq. 1}$$

where $s_{threshold}$ is a threshold (e.g., thresholding 310) to filter the association score matrix 422. For example, $s_{threshold}=0.5$ could be used as the threshold. Track pair data obtained from the assignment matrix may be used by an object tracker and other automotive systems to safely navigate a driving environment.

Example Methods

Figure 5:
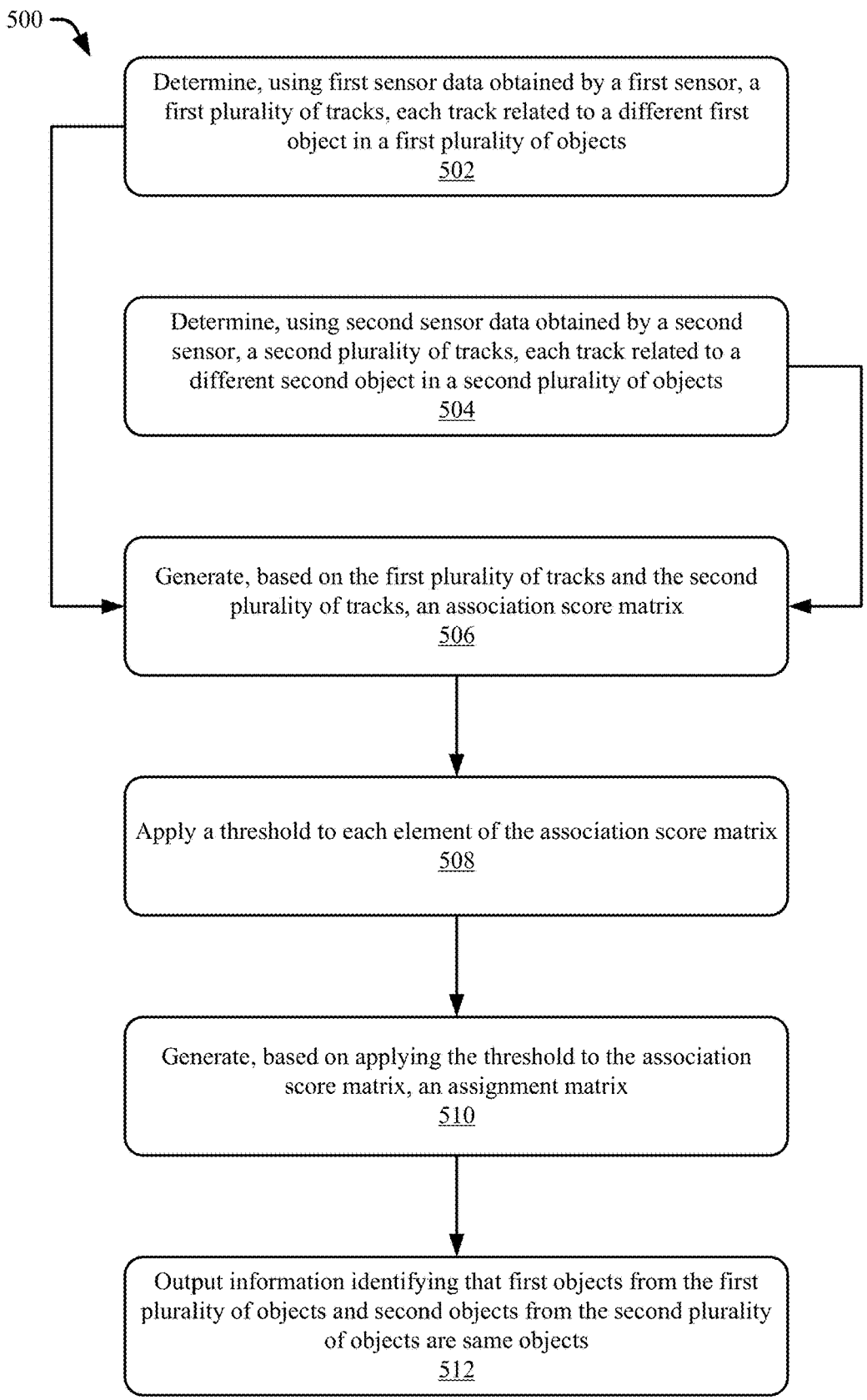
FIG. 5 illustrates an example method for deep association for sensor fusion, in accordance with techniques of this disclosure.

FIG. 5 illustrates an example method 500 for deep association for sensor fusion, in accordance with techniques of this disclosure. Method 500 is shown as sets of operations (or acts) performed, but not necessarily limited to the order or combinations in which the operations are shown herein. Further, any of one or more of the operations may be repeated, combined, or reorganized to provide other methods.

At step 502, a first plurality of tracks is determined using first sensor data obtained by a first sensor of a vehicle, and at step 504, a second plurality of tracks is determined using second sensor data obtained by a second sensor of the vehicle. Each of the tracks in the first plurality of tracks may represent (e.g., associate with) a different first object from a first plurality of objects. Likewise, each of the tracks in the second plurality of tracks may represent a different second object from a second plurality of objects. At least some of the first objects represented in the first plurality of tracks may also be represented by the second objects in second plurality of tracks. Throughout this disclosure, the example first sensor has been described as a camera sensor and a radar sensor, respectively; however, the first sensor and the second sensor may be any sort of perception sensor that can gather information about objects in an environment. Some non-limiting examples of perception sensors include vision cameras, infra-red cameras, radar systems, LiDAR, and sound-based sensors (e.g., ultra-sonic sensors).

At step 506, an association score matrix is generated based on the first plurality of tracks and the second plurality of tracks (e.g., track pairs). The association score matrix is a probability score matrix and indicates the likelihood that a track from the first plurality of tracks and a track from the second plurality of tracks associate with the same object. The association score matrix may be generated by a deep learning trained model (e.g., the DCRAN 400) employed in a sensor fusion system or other system.

At step 508, a threshold is applied to each element of the association score matrix. For example, if the values of each element range from 0 to 1, then a threshold value of 0.5 may be used to determine if a track pair represents the same object. If the probability of the track pair is below the threshold, then that track pair is assigned a binary value of zero. If the probability of the track pair is above the threshold, then that track pair is assigned a binary value of one.

At step 510, an assignment matrix is generated based on applying the threshold to the association score matrix. The assignment matrix includes the binary values for each track pair as described in step 508.

At step 512, information identifying that first objects from the first plurality of objects and second objects from the second plurality of objects, respectively, are same objects is output. The object information may be output to an object tracking system or other automotive systems. The object information may be used by these systems to track and predict the trajectory of objects in a driving environment and may increase the safety of navigating through the driving environment.

Additional Examples

Example 1: A method comprising: determining, using first sensor data obtained by a first sensor of a vehicle, a first plurality of tracks, each track of the first plurality of tracks related to a different first object of a first plurality of objects; determining, using second sensor data obtained by a second sensor of the vehicle, a second plurality of tracks, each track of the second plurality of tracks related to a different second object of a second plurality of objects; generating, based on the first plurality of tracks and the second plurality of tracks, an association score matrix indicative of a probability that each first object in the first plurality of objects and each second object in the second plurality of objects are a same object; applying a threshold to each element of the association score matrix; generating, based on applying the threshold to the association score matrix, an assignment matrix that is indicative of each first object from the first plurality of objects being associated with a second object from the second plurality of objects; and outputting, based on the assignment matrix and to an automotive system of the vehicle, information identifying that first objects from the first plurality of objects and second objects from the second plurality of objects, respectively, are same objects.

Example 2: The method of example 1, wherein generating the association score matrix comprises employing a model trained to extract abstract features from each track of the first plurality of tracks and each track of the second plurality of tracks, the model including a feature extractor, based on a convolutional neural network, and a memory-based neural network.

Example 3: The method of any one of the preceding examples, wherein: the feature extractor includes one or more convolutional layers alternating with one or more pooling layers; and the memory-based neural network includes a memory-based layer followed by one or more dense layers.

Example 4: The method of any one of the preceding examples, wherein the memory-based neural network comprises: a long short-term memory recurrent neural network; or a transformer network.

Example 5: The method of any one of the preceding examples, wherein the model is trained with two constraints: a first constraint being that one track from the first plurality of tracks can be associated with only one track from the second plurality of tracks; and a second constraint being that one track from the second plurality of tracks can be associated with only one track from the first plurality of tracks.

Example 6: The method of any one of the preceding examples, wherein the model is trained using focal loss to address imbalanced data and hard examples.

Example 7: The method of any one of the preceding examples, wherein the model is trained using polynomial data expansion to increase a current track attribute space and address a non-linear relationship between input data of the model and the assignment matrix.

Example 8: The method of any one of the preceding examples, wherein: the first sensor comprises a radar sensor, a camera sensor, or a light detection and ranging (LiDAR) sensor; and the second sensor comprises the radar sensor, the camera sensor, or the LiDAR sensor, the second sensor being a different type of sensor than the first sensor.

Example 9: A system comprising: at least one processor configured to: determine, using first sensor data obtained by a first sensor of a vehicle, a first plurality of tracks, each track of the first plurality of tracks related to a different first object of a first plurality of objects; determine, using second sensor data obtained by a second sensor of the vehicle, a second plurality of tracks, each track of the second plurality of tracks related to a different second object of a second plurality of objects; generate, based on the first plurality of tracks and the second plurality of tracks, an association score matrix indicative of a probability that each first object in the first plurality of objects and each second object in the second plurality of objects are a same object; apply a threshold to each element of the association score matrix; generate, based on applying the threshold to the association score matrix, an assignment matrix that is indicative of each first object from the first plurality of objects being associated with a second object from the second plurality of objects; and output, based on the assignment matrix and to an automotive system of the vehicle, information identifying that first objects from the first plurality of objects and second objects from the second plurality of objects, respectively, are same objects.

Example 10: The system of any one of the preceding examples, wherein the processor is configured to generate the association score matrix by at least: employing a model trained to extract abstract features from each track of the first plurality of tracks and each track of the second plurality of tracks, the model including a feature extractor, based on a convolutional neural network, and a memory-based neural network.

Example 11: The system of any one of the preceding examples, wherein: the feature extractor includes one or more convolutional layers alternating with one or more pooling layers; and the memory-based neural network includes a memory-based layer followed by one or more dense layers.

Example 12: The system of any one of the preceding examples, wherein the memory-based neural network comprises: a long short-term memory recurrent neural network; or a transformer network.

Example 13: The system of any one of the preceding examples, wherein the model is trained with two constraints: a first constraint being that one track from the first plurality of tracks can be associated with only one track from the second plurality of tracks; and a second constraint being that one track from the second plurality of tracks can be associated with only one track from the first plurality of tracks.

Example 14: The system of any one of the preceding examples, wherein the model is trained using focal loss to address imbalanced data and hard examples.

Example 15: The system of any one of the preceding examples, wherein the model is trained using polynomial data expansion to increase a current track attribute space and address a non-linear relationship between input data of the model and the assignment matrix.

Example 16: The system of any one of the preceding examples, wherein: the first sensor comprises a radar sensor, a camera sensor, or a light detection and ranging (LiDAR) sensor; and the second sensor comprises the radar sensor, the camera sensor, or the LiDAR sensor, the second sensor being a different type of sensor than the first sensor.

Example 17: A computer-readable storage media comprising instructions that, when executed, configure a processor to: determine, using first sensor data obtained by a first sensor of a vehicle, a first plurality of tracks, each track of the first plurality of tracks related to a different first object of a first plurality of objects; determine, using second sensor data obtained by a second sensor of the vehicle, a second plurality of tracks, each track of the second plurality of tracks related to a different second object of a second plurality of objects; generate, based on the first plurality of tracks and the second plurality of tracks, an association score matrix indicative of a probability that each first object in the first plurality of objects and each second object in the second plurality of objects are a same object; apply a threshold to each element of the association score matrix; generate, based on applying the threshold to the association score matrix, an assignment matrix that is indicative of each first object from the first plurality of objects being associated with a second object from the second plurality of objects; and output, based on the assignment matrix and to an automotive system of the vehicle, information identifying that first objects from the first plurality of objects and second objects from the second plurality of objects, respectively, are same objects.

Example 18: The computer-readable storage media of any one of the preceding examples, wherein the instructions configure the processor to generate the association score matrix by at least: employing a model trained to extract abstract features from each track of the first plurality of tracks and each track of the second plurality of tracks, the model including a feature extractor, based on a convolutional neural network, and a memory-based neural network.

Example 19: The computer-readable storage media of any one of the preceding examples, wherein: the feature extractor includes one or more convolutional layers alternating with one or more pooling layers; and the memory-based neural network includes a memory-based layer followed by one or more dense layers.

Example 20: The computer-readable storage media of any one of the preceding examples, wherein the model is trained using: a first constraint being that one track from the first plurality of tracks can be associated with only one track from the second plurality of tracks; a second constraint being that one track from the second plurality of tracks can be associated with only one track from the first plurality of tracks; focal loss to address imbalanced data and hard examples; and polynomial data expansion to increase a current track attribute space and address a non-linear relationship between input data of the model and the assignment matrix.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with data association can occur in other systems. Therefore, although primarily described in the context of fusing sensor data in automotive vehicles, the techniques for fusing data from different sensors can be applied to other applications where accuracy of trained models are desired. Further, these techniques may also be applied to other systems that require fusion of data from different sources.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   determining, using first sensor data obtained by a first sensor of a vehicle, a first plurality of tracks, each track of the first plurality of tracks related to a different first object of a first plurality of objects;
   determining, using second sensor data obtained by a second sensor of the vehicle, a second plurality of tracks, each track of the second plurality of tracks related to a different second object of a second plurality of objects;
   generating, based on the first plurality of tracks and the second plurality of tracks, an association score matrix indicative of a probability that each first object in the first plurality of objects and each second object in the second plurality of objects are a same object;
   applying a threshold to each element of the association score matrix;

generating, based on applying the threshold to the association score matrix, an assignment matrix that is indicative of each first object from the first plurality of objects being associated with a second object from the second plurality of objects;

outputting, based on the assignment matrix and to an automotive system of the vehicle, information identifying that first objects from the first plurality of objects and second objects from the second plurality of objects, respectively, are same objects, and by the automotive system, based on the output information, navigating an environment of the vehicle, wherein generating the association score matrix comprises employing a model trained to extract abstract features from each track of the first plurality of tracks and each track of the second plurality of tracks, the model including an encoder, based on a convolutional neural network, and a decoder, based on a memory-based neural network, and wherein the model is trained with two constraints:
   a first constraint being that one track from the first plurality of tracks can be associated with only one track from the second plurality of tracks; and
   a second constraint being that one track from the second plurality of tracks can be associated with only one track from the first plurality of tracks.

2. The method of claim 1, wherein:
the encoder includes one or more convolutional layers alternating with one or more pooling layers; and
the decoder includes a memory-based layer followed by one or more dense layers.

3. The method of claim 1, wherein the memory-based neural network comprises:
a long short-term memory recurrent neural network; or
a transformer network.

4. The method of claim 1, wherein the model is trained using focal loss to address imbalanced data and hard examples.

5. The method of claim 1, wherein the model is trained using polynomial data expansion to increase a current track attribute space and address a non-linear relationship between input data of the model and the assignment matrix.

6. The method of claim 1, wherein:
the first sensor comprises a radar sensor, a camera sensor, or a light detection and ranging (LiDAR) sensor; and
the second sensor comprises the radar sensor, the camera sensor, or the LiDAR sensor, the second sensor being a different type of sensor than the first sensor.

7. A system comprising:
at least one processor configured to:
   determine, using first sensor data obtained by a first sensor of a vehicle, a first plurality of tracks, each track of the first plurality of tracks related to a different first object of a first plurality of objects;
   determine, using second sensor data obtained by a second sensor of the vehicle, a second plurality of tracks, each track of the second plurality of tracks related to a different second object of a second plurality of objects;
   generate, based on the first plurality of tracks and the second plurality of tracks, an association score matrix indicative of a probability that each first object in the first plurality of objects and each second object in the second plurality of objects are a same object;
   apply a threshold to each element of the association score matrix;
   generate, based on applying the threshold to the association score matrix, an assignment matrix that is indicative of each first object from the first plurality of objects being associated with a second object from the second plurality of objects; and
   output, based on the assignment matrix and to an automotive system of the vehicle, information identifying that first objects from the first plurality of objects and second objects from the second plurality of objects, respectively, are same objects;
the automotive system configured to, based on the output information, navigate an environment of the vehicle, wherein generating the association score matrix comprises employing a model trained to extract abstract features from each track of the first plurality of tracks and each track of the second plurality of tracks, the model including an encoder, based on a convolutional neural network, and a decoder, based on a memory-based neural network, and wherein the model is trained with two constraints:
   a first constraint being that one track from the first plurality of tracks can be associated with only one track from the second plurality of tracks; and
   a second constraint being that one track from the second plurality of tracks can be associated with only one track from the first plurality of tracks.

8. The system of claim 7, wherein:
the encoder includes one or more convolutional layers alternating with one or more pooling layers; and
the decoder includes a memory-based layer followed by one or more dense layers.

9. The system of claim 7, wherein the memory-based neural network comprises:
a long short-term memory recurrent neural network; or
a transformer network.

10. The system of claim 7, wherein the model is trained using focal loss to address imbalanced data and hard examples.

11. The system of claim 7, wherein the model is trained using polynomial data expansion to increase a current track attribute space and address a non-linear relationship between input data of the model and the assignment matrix.

12. The system of claim 7, wherein:
the first sensor comprises a radar sensor, a camera sensor, or a light detection and ranging (LiDAR) sensor; and
the second sensor comprises the radar sensor, the camera sensor, or the LiDAR sensor, the second sensor being a different type of sensor than the first sensor.

13. A non-transitory computer-readable storage media comprising instructions that, when executed, configure one or more processors to:
determine, using first sensor data obtained by a first sensor of a vehicle, a first plurality of tracks, each track of the first plurality of tracks related to a different first object of a first plurality of objects;
determine, using second sensor data obtained by a second sensor of the vehicle, a second plurality of tracks, each track of the second plurality of tracks related to a different second object of a second plurality of objects;
generate, based on the first plurality of tracks and the second plurality of tracks, an association score matrix indicative of a probability that each first object in the first plurality of objects and each second object in the second plurality of objects are a same object;
apply a threshold to each element of the association score matrix;

generate, based on applying the threshold to the association score matrix, an assignment matrix that is indicative of each first object from the first plurality of objects being associated with a second object from the second plurality of objects;

output, based on the assignment matrix and to an automotive system of the vehicle, information identifying that first objects from the first plurality of objects and second objects from the second plurality of objects, respectively, are same objects;

based on the output information, navigate an environment of the vehicle, wherein generating the association score matrix comprises employing a model trained to extract abstract features from each track of the first plurality of tracks and each track of the second plurality of tracks, the model including an encoder, based on a convolutional neural network, and a decoder, based on a memory-based neural network, and wherein the model is trained with two constraints:
   a first constraint being that one track from the first plurality of tracks can be associated with only one track from the second plurality of tracks; and
   a second constraint being that one track from the second plurality of tracks can be associated with only one track from the first plurality of tracks.

14. The non-transitory computer-readable storage media of claim 13, wherein:
the encoder includes one or more convolutional layers alternating with one or more pooling layers; and
the decoder includes a memory-based layer followed by one or more dense layers.

15. The non-transitory computer-readable storage media of claim 13, wherein the model is trained using:
focal loss to address imbalanced data and hard examples; and
polynomial data expansion to increase a current track attribute space and address a non-linear relationship between input data of the model and the assignment matrix.

* * * * *